United States Patent
Bailey et al.

(10) Patent No.: US 11,223,201 B1
(45) Date of Patent: Jan. 11, 2022

(54) ELECTRICAL POWER SHARING SYSTEM AND METHOD

(71) Applicants: Richard Bailey, Kirkland, WA (US); David A. Graves, Seattle, WA (US)

(72) Inventors: Richard Bailey, Kirkland, WA (US); David A. Graves, Seattle, WA (US)

( * ) Notice: Subject to any disclaimer, the term of this patent is extended or adjusted under 35 U.S.C. 154(b) by 0 days.

(21) Appl. No.: 17/372,674

(22) Filed: Jul. 12, 2021

Related U.S. Application Data

(60) Provisional application No. 63/050,398, filed on Jul. 10, 2020.

(51) Int. Cl.
*H02J 3/14* (2006.01)
*G05F 1/12* (2006.01)

(52) U.S. Cl.
CPC . *H02J 3/14* (2013.01); *G05F 1/12* (2013.01)

(58) Field of Classification Search
CPC .................................. H02J 3/14; G05F 1/12
See application file for complete search history.

(56) References Cited

U.S. PATENT DOCUMENTS

| | | |
|---|---|---|
| 4,100,426 A | 7/1978 | Baranowski et al. |
| 4,419,589 A | 12/1983 | Ross |
| 4,687,948 A | 8/1987 | Helt |
| 4,695,738 A | 9/1987 | Wilmot |
| 5,581,132 A | 12/1996 | Chadwick |
| 2012/0080940 A1 | 4/2012 | Larsen |

*Primary Examiner* — Robert L Deberadinis
(74) *Attorney, Agent, or Firm* — Houda El-Jarrah; Bold IP, PLLC

(57) ABSTRACT

A system and method for delivering shared electrical power between two or more electronic devices is provided. The system connects directly to an electrical power source and provides a continual power connection between the power source and one or more primary electronic device(s), and simultaneously, provides a switched power connection between the power source and one or more secondary electronic device(s). The system includes a power sensing system for sensing power drawn by a primary electronic device, and upon sensing that the primary device is drawing a power level below a predetermined threshold (e.g., 200 watts), the system connects a secondary electronic device to the power source (while leaving the primary electronic device still connected) so that it also may draw power. Example primary electronic devices include an electric clothes dryer, and example secondary electronic devices include a Type 2 electric vehicle charger.

20 Claims, 2 Drawing Sheets

ELECTRICAL POWER SHARING SYSTEM AND METHOD

CROSS-REFERENCE TO RELATED APPLICATIONS

This application claims priority to U.S. Provisional Application No. 63/050,398 filed Jul. 10, 2020, the entire contents of which are hereby fully incorporated herein by reference for all purposes.

FIELD OF THE INVENTION

This invention relates to electrical power sharing, and more particularly to power sharing between a primary appliance and a secondary appliance.

BACKGROUND OF THE INVENTION

In most residential and/or commercial buildings, electrical power is provided via one or more circuit breakers connected to an electrical power grid. The various electrical outlets and/or dedicated electrical power lines within the buildings are electrically connected to the circuit breakers to receive power.

The power provided by the electrical grid to the circuit breakers is typically regulated, and the various electrical outlets and dedicated electrical power lines are each connected to specific circuit breakers with known power providing capacities. In this way, the power consumption within the building may be generally balanced and accounted for.

However, buildings may oftentimes include limited available power circuits, and a home or business owner within the buildings may require additional power.

In addition, high-power electronic devices (e.g., appliances such as an electric clothes dryers, electric stoves, etc.) may draw high power when in full operation and lower power during other operating modes. However, when a high-power appliance is not in full operation, and therefore not drawing high power from a circuit breaker, any surplus power is typically not available for use by other appliances, including appliances that may benefit from having additional charging time, such as electric vehicles, smartphones, smartwatches, or any other type of device/appliance that the user may want to have charged.

Accordingly, there is a need for a system and method that enables the sharing of a single circuit breaker between two or more electrical appliances. There also is a need for a system and method that enables the sharing of a single circuit breaker between two or more electrical appliances while prioritizing a first electrical appliance's power needs over a second electrical appliance's power needs.

SUMMARY

According to one aspect, one or more embodiments are provided below for an electrical power sharing system comprising a first port adapted to receive electrical power from a power supply, a second port in electrical communication with the first port and adapted to deliver to a first load a first amount of the electrical power received at the first port, a power sensing device configured to sense a first value representative of the first amount of electrical power delivered by the second port to the first load and to output a first signal based on the sensed first value, a power switch including a switch input and a switch output, and adapted to provide an electrical connection or an electrical disconnection between the switch input and the switch output, the switch input in electrical communication with the first port, a third port in electrical communication with the switch output, and a controller in communication with the power sensing device and the power switch, and including memory storing at least one power level threshold, wherein the controller is adapted to receive the first signal from the power sensing device, to process the first signal in relation to the at least one power level threshold, and, based at least in part on an outcome of the processing, to cause the power switch to provide either an electrical connection or an electrical disconnection between the switch input and the switch output.

In another embodiment, the electrical power sharing system of claim 1, wherein when the power switch provides an electrical connection between the switch input and the switch output, the third port is adapted to deliver to a second load a second amount of electrical power received at the first port.

In another embodiment, the electrical power sharing system of claim 1, wherein the power sensing device includes a current sensing device.

In another embodiment, the electrical power sharing system of claim 3, wherein the first value includes a value of electrical current.

In another embodiment, the electrical power sharing system of claim 1, wherein the controller is adapted to transform the first value into a first power value.

In another embodiment, the electrical power sharing system of claim 5, wherein the controller is adapted to process the first signal in relation to the at least one power level threshold by comparing the first power level to the at least one power level threshold.

In another embodiment, the electrical power sharing system of claim 6, wherein the controller is adapted to cause the power switch to provide an electrical connection between the switch input and the switch output when the comparison determines that the first power level is less than the at least one power level threshold.

In another embodiment, the electrical power sharing system of claim 6, wherein the controller is adapted to cause the power switch to provide an electrical disconnection between the switch input and the switch output when the comparison determines that the first power level is greater than the at least one power level threshold.

In another embodiment, the electrical power sharing system of claim 1, further comprising a housing configured to contain the power sensing device, the power switch, and the controller.

In another embodiment, the electrical power sharing system of claim 1, further comprising an electric vehicle charger electrically coupled to the third port.

In another embodiment, the electrical power sharing system of claim 10, wherein the electric vehicle charger includes a Type 2 electric vehicle charger.

In another embodiment, the electrical power sharing system of claim 11, wherein the at least one power level threshold equals 200 watts.

According to another aspect, one or more embodiments are provided below for a method for sharing electrical power comprising: providing a first port in electrical communication with a second port, the first port configured to receive first electrical power and the second port adapted to deliver second electrical power, electrically coupling a primary appliance to the second port, the primary appliance configured to draw at least a portion of the second electrical power, providing a power sensing device between the first port and the second port and adapted to sense a first value representative of the at least a portion of the second electrical power drawn by the primary appliance, providing a power switch including a switch input and a switch output, and adapted to provide an electrical connection or an electrical disconnection between the switch input and the switch output, the switch input in electrical communication with the first port, providing a third port in electrical communication with the switch output, the third port adapted to deliver third electrical power, electrically coupling a secondary appliance to the third port, the secondary appliance configured to draw at least a portion of the third electrical power, providing a controller in communication with the power sensing device and the power switch, and including memory storing at least one power level threshold, using the power sensing device to sense a first value representative of the at least a portion of the second electrical power drawn by the primary appliance, using the controller to process the first signal in relation to the at least one power level threshold to determine if the at least a portion of the second electrical power drawn by the primary appliance is less than the at least one power level threshold, and in response to a determination that the at least a portion of the second electrical power drawn by the primary appliance is less than the at least one power level threshold, then using the controller to cause the power switch to provide an electrical connection between the switch input and the switch output.

In another embodiment, the method further comprises in response to a determination in that the at least a portion of the second electrical power drawn by the primary appliance is greater than the at least one power level threshold, then using the controller to cause the power switch to provide an electrical disconnection between the switch input and the switch output.

In another embodiment, the method further comprises using the controller to cause the power switch to provide an electrical disconnection between the switch input and the switch output.

In another embodiment, the power sensing device includes a current sensing device.

In another embodiment, the first value includes a value of electrical current.

In another embodiment, the method further comprises electrically coupling an electric vehicle charger between the switch output and the third port.

In another embodiment, the electric vehicle charger includes a Type 2 electric vehicle charger.

In another embodiment, the at least one power level threshold equals 200 watts.

Other aspects and advantages of the invention will be apparent from the following description and the appended claims.

BRIEF DESCRIPTION OF THE DRAWINGS

Elements in the figures have not necessarily been drawn to scale in order to enhance their clarity and improve understanding of these various elements and embodiments of the invention. Furthermore, elements that are known to be common and well understood to those in the industry are not depicted in order to provide a clear view of the various embodiments of the invention, thus the drawings are generalized in form in the interest of clarity and conciseness.

DETAILED DESCRIPTIONS OF PREFERRED EMBODIMENTS

In general, the system and method according to exemplary embodiments hereof provides for the sharing of electrical power between two or more electronic devices (also referred to herein as appliances). In some embodiments, the system connects directly to an electrical power source (e.g., via a 240 VAC circuit breaker) and provides a continual power connection between the power source and one or more primary electronic device(s). Simultaneously, the system provides a switched power connection between the power source and one or more secondary electronic device (s). The system may be used with residential and/or commercial electrical power distribution networks where shared power connections to individual power sources is desired.

In some embodiments, the system includes a power sensing system for sensing power drawn by a primary electronic device, and upon sensing that the primary device is drawing a power level below a predetermined threshold (e.g., 200 watts), the system connects a secondary electronic device to the power source (while leaving the primary electronic device still connected) so that it also may draw power. In this configuration, both the primary device and the secondary device may draw power from the circuit breaker. In this way, the system effectively enables the sharing of a single power source (e.g., a single 240 VAC circuit breaker) between the primary and secondary appliances, with the primary appliance having priority over the secondary appliance.

In some embodiments, upon sensing that the primary device is drawing a power level equal to or greater than a predetermined threshold power level, the system disconnects the secondary device(s) from the circuit breaker leaving only the primary device connected to draw power. Operation may continue until it is determined that the primary device may once again draw a power level less than the threshold level at which time the system may connect the secondary device to the power source such that both the primary and secondary devices may again draw power.

Example primary electronic devices may include electric clothes dryers, electric ovens or stoves, electric water heaters, other types of electronic devices, and any combination thereof. Example secondary electronic devices may include an electric vehicle charger, a jacuzzi, other types of electronic devices, and any combination thereof. It is understood that these examples are for demonstration and that the primary and/or secondary electronic devices may include any types of electronic devices. It also is understood that in some embodiments, a primary device may be of the same type as a secondary device, and vice versa.

Figure 1:
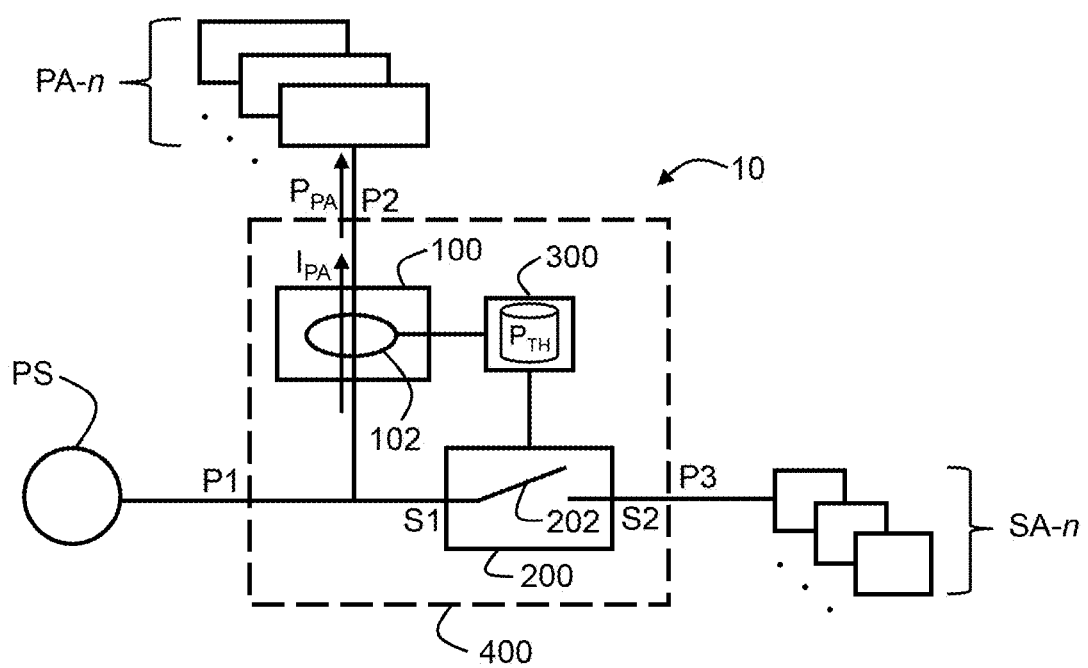
FIG. 1 shows a schematic of an electrical power sharing system in accordance with an embodiment of the present invention.
Figure 2:
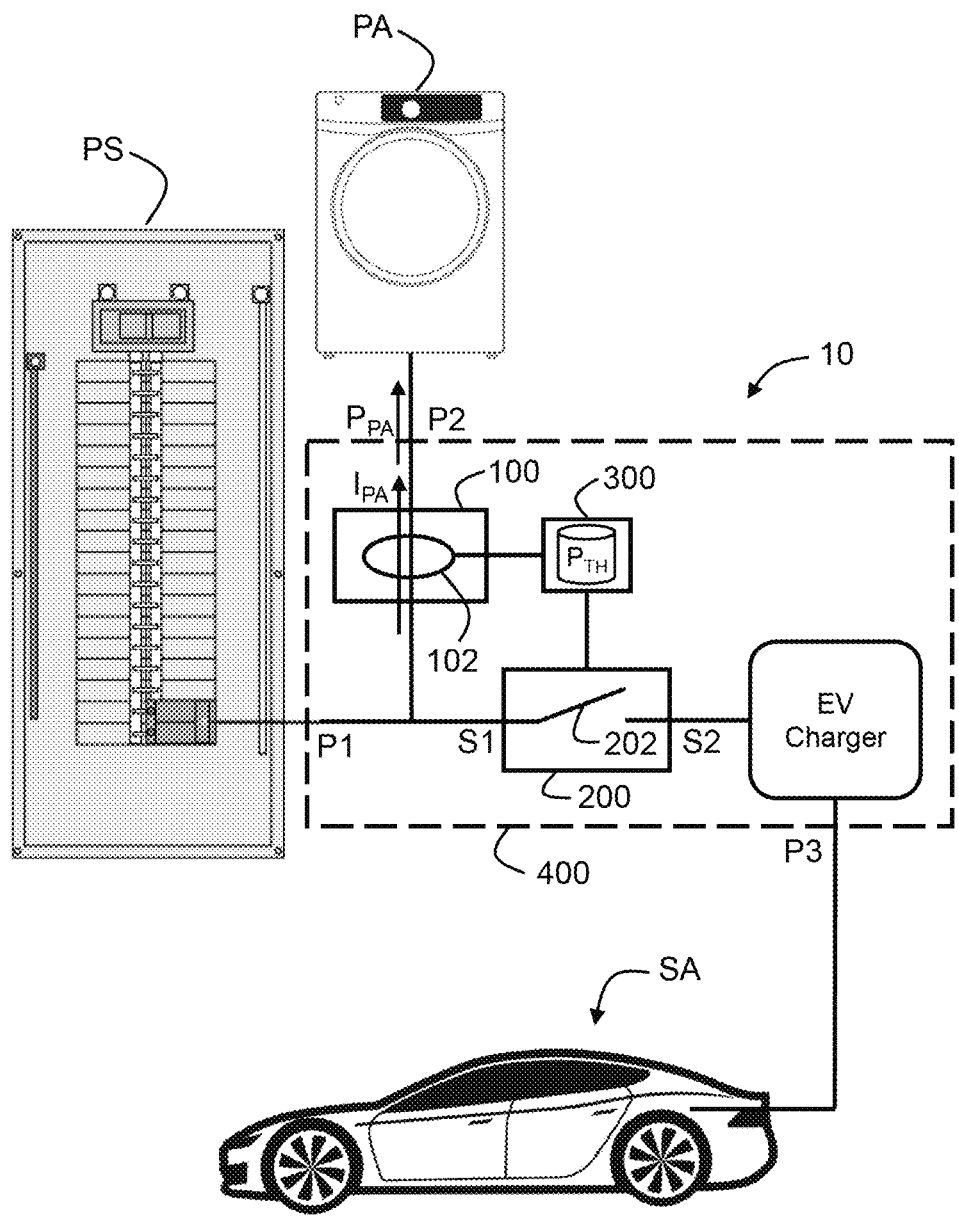
FIG. 2 shows a schematic of an electrical power sharing system in an in-use example in accordance with an embodiment of the present invention.

Referring now to FIGS. 1-2, the invention according to exemplary embodiments hereof will be described in further detail.

In one exemplary embodiment hereof as shown in FIG. 1, the system 10 includes a power sensing system 100, a power switch assembly 200, a controller 300, and a housing assembly 400. The system 10 also may include other elements and components as necessary for it to fulfill its functionalities.

FIG. 1 depicts a general schematic of the system 10 configured with a power source PS (e.g., a circuit breaker connected to an electrical grid), one or more primary appliances PA-n (collectively and individually PA), and one or more secondary appliance SA-n (collectively and individually SA). In some embodiments, the system 10 includes three or more ports P1, P2, P3, with the power source PS electrically coupled to the first port P1, the primary appliance PA electrically coupled to the second port P2, and the secondary appliance SA-n (collectively and individually SA) electrically coupled to the third port P3.

In some embodiments as shown in FIG. 1, the primary appliance PA is electrically connected to the power source PS via a dedicated connection, and the secondary appliance SA is connected to the power source PS via a switched connection. In general, the primary appliance PA draws power from the power source PS, and the power sensing system 100 monitors this power and communicates the monitored power levels to the controller 300. The controller 300 processes the data received from the power sensing system 100, and depending on the level of power drawn by the primary appliance PA, connects or disconnects (via the power switch assembly 200) the secondary appliance SA to or from the power source PS. In this way, when it is deemed that there is surplus power available from the power source PS, the surplus power is made available to the secondary appliance SA.

For the purposes of this specification, the system and method will be primarily described in relation to a single primary appliance PA and a single secondary appliance SA. However, it is understood by a person of ordinary skill in the art that the system and method may be used to provide continual power to more than one primary appliance PA and switched power to more than one secondary appliance SA. In this case, the secondary appliances SA may be prioritized in relation to one another and switched power may be provided to the secondary appliances SA according to each secondary appliance's SA's priority.

Power Sensing System 100

In one exemplary embodiment hereof, the power sensing system 100 measures the power drawn $P_{PA}$ from the power source PS by the primary appliance PA. In some embodiments, the power sensing system 100 measures the actual power drawn $P_{PA}$, and in other embodiments, the power sensing system 100 may measure other quantities that may be proportional to, that may represent, and/or that may otherwise be used to determine the power drawn $P_{PA}$. The power sensing may occur in real time, near real time, pseudo real time, at time intervals, according to trigger events, randomly, at other times, and at any combination thereof. The power sensing system 100 may include any type of adequate power sensing device or elements, and it is understood by a person of ordinary skill in the art that the system 10 is not limited in any way by the type or types of power sensing devices or elements that the power sensing system 100 utilizes.

For example, in some embodiments as shown in FIG. 1, the power sensing system 100 includes a current sensing system 102 that senses the electrical current $I_{PA}$ drawn from the power source PS by the primary appliance PA (i.e., the current $I_{PA}$ flowing through the system 10 and into the primary appliance PA). The current sensing system 102 may sense AC and/or DC and may include direct current sensing elements and/or indirect current sensing elements.

In a first example, direct current sensing elements may include a shunt resistor in series with the input to the primary appliance PA to generate a voltage across the resistor proportional to the primary appliance PA load current $I_{PA}$. The voltage across the shunt may be measured using differential amplifiers such as current shunt monitors (CSMs), operational amplifiers (op-amps), difference amplifiers (DAs), instrumentation amplifiers (IAs), other types of direct current sensing devices, and any combination thereof.

In another example, indirect current sensing elements may include coils (e.g., Rogowski coils), Hall effect sensors, flux gate sensors, magneto-resistor current sensors, other types of indirect sensing devices, and any combination thereof. For instance, a Hall effect sensor may be used to measure an induced magnetic field across a coil created by the primary current $I_{PA}$ with the measured magnetic field proportional to the primary appliance PA load current $I_{PA}$.

Other types of current sensing technologies such as, but not limited to, transformer(s) and other types of elements also may be used, and it is understood by a person of ordinary skill in the art that the scope of the system 10 is not limited in any way by the type of current sensing system 102 that may be employed. It also is understood that other types of power measuring systems 100 also may be used instead of or in addition to the current sensing system 102.

Upon sensing the power, the power sensing system 100 may output a signal representative of the amount of power being drawn $P_{PA}$ by the primary appliance PA, and the signal may be communicated to the controller 300. For example, in some embodiments, the current sensing system 102 may output a signal proportional to the sensed current $I_{PA}$. The output signal may include an analog voltage, an analog current, a digital output, other types of output signals, and any combination thereof. As will be described in other sections, the controller 300 may receive the output signal from the power sensing system 100 and interpret the signal to determine the actual amount of power being drawn by the primary appliance PA at any given time. The controller 300 may then provide operational instructions to other elements of the system 10 (e.g., to the power switch assembly 200) based on this determination.

Power Switch Assembly 200

In one exemplary embodiment hereof as shown in FIG. 1, the power switch assembly 200 includes a power switch 202 that controls the flow of electricity between the power supply PS and the secondary appliance SA.

In some embodiments as shown in FIG. 1, the power switch 202 includes a switch input port S1 and a switch output port S2 and is configured to open and/or close an electrical connection between the switch input S1 and the switch output S2, as required. In some embodiments, the power switch 202 includes a single-pole-single-throw (SPST) switch, however, other types of power switches 202 also may be used.

In some embodiments as shown in FIG. 1, the power source PS is electrically coupled to the switch input port S1 (e.g., via the first port P1 of the system 10) and the secondary appliance SA is electrically coupled to the switch output port S2 (e.g., via the third port P3 of the system 10). In this configuration, the power switch 202 is configured to either (i) connect the secondary appliance SA to the power source PS so that the secondary appliance SA may draw power from the power source PS, or (ii) disconnect the secondary appliance SA from the power source PS so that the secondary appliance SA may not draw power from the power source PS. It is understood that other types of power switches 202 and/or power switching devices may be utilized to perform this functionality, and that the scope of the system 10 is not limited in any way by the type(s) of power switching assembly 200 used.

The power switch 202 is preferably designed and rated to conduct and switch the electrical levels required by the secondary appliance SA (e.g., current, voltage, power, etc.).

For example, in some embodiments, the power switch 202 may switch 240 VAC @ up to 40 amps to the secondary appliance SA, as required. It is understood that other electrical levels also may be required and that the power switch 202 is preferably rated to provide switching capabilities at any required electrical level(s) and/or speeds.

Controller 300

In one exemplary embodiment hereof as shown in FIG. 1, the controller 300 is configured to interface with the power sensing system 100 and the power switch assembly 200. In some embodiments, the controller 300 receives data from the power sensing system 100 and uses the data to determine (preferably in real time) the power level $P_{PA}$ being drawn by the primary appliance PA at any given moment. Then, based on this determination, the controller 300 may cause the power switch assembly 200 to connect or disconnect the secondary appliance SA to or from the power source PS.

In some embodiments, the controller 300 includes a microcontroller, a microprocessor, a system on a chip (SoC), a computer, other types of controllers, and any combination thereof. The controller 300 also may include memory and other elements, as necessary. The controller 300 preferably includes one or more software program(s), applications, and/or code that may instruct the controller 300 to perform its required functionalities. For example, the controller's 300's software may include drivers that enable the controller 300 to interface with (and control) the various elements of the system 10 (e.g., the power sensing system 100 and the power switch assembly 200). The software also may be used to perform transformations on the data it may receive, to output data in different formats to the user, and to perform other functions. The software program(s) or code may be provided with the controller 300 as a preloaded library of functions, may be programmed as high-level languages (e.g., Java, C++, etc.) and then compiled into assembly language and/or machine code for use on the controller 300, may be provided using other techniques, or by any combination thereof.

In one exemplary embodiment hereof, the controller 300 receives the output signal(s) from the power sensing system 100, and operates on the output signal(s) using programmed logic, functions, and/or mathematical equations (e.g., Joule's Law, etc.) to determine the amount of power $P_{PA}$ being drawn by the primary appliance PA.

As described in other sections, this process of receiving signals from the power sensing system 100 and utilizing the signals to determine the power $P_{PA}$ may preferably happen continually and in real time (at least while the primary appliance PA and the secondary appliance SA are both connected to the system 10).

In some embodiments, the controller 300 compares the determined power draw $P_{PA}$ of the primary appliance PA to a predetermined threshold power level $P_{TH}$ (e.g., stored in memory), and based on the results of the comparison, sends specific control signals to the power switch assembly 200. This comparison procedure may be continual and may occur at a predefined frequency (e.g., once a millisecond). In some embodiments, the threshold power level $P_{TH}$ may be set to any desired value (e.g., 200 watts). In other embodiments, the system 10 may store a plurality of threshold power levels $P_{TH}$ (e.g., in controller memory) with each threshold power level $P_{TH}$ corresponding to one or more time segments. In some embodiments, the one or more time segments may include any desired time segment(s) of any particular day, week, month, year, etc. In this way, the system 10 may compare the power draw $P_{PA}$ of the primary appliance PA to a specific threshold power lever $P_{TH}$ depending on the time of day, the day of the week, the month, the year, etc.

In some embodiments, if the controller 300 determines that the power draw $P_{PA}$ of the primary appliance PA is less than the threshold power level $P_{TH}$, the controller 300 sends a command (e.g., a voltage signal) to the power switch assembly 200 to close the switch 202. In this case, upon closing the power switch 202, the power source PS is electrically connected to the secondary appliance SA so that the secondary appliance SA may draw power from the power source PS. This also may occur if and when the primary appliance PA may be turned off or otherwise removed from the system 10 and the power sensing system 100 measures zero power drawn $P_{PA}$.

In one embodiment, if the controller 300 determines that the power draw $P_{PA}$ of the primary appliance PA is greater than the threshold power level $P_{TH}$, the controller 300 sends a command (e.g., a voltage signal) to the power switch assembly 200 to open the switch 202. In this case, upon opening the power switch 202, the secondary appliance SA is electrically disconnected from the power source PS so that the secondary appliance SA may not draw power from the power source PS. This scenario leaves the primary appliance PA connected to the power source PS and able to draw power therefrom.

Note that if the controller 300 determines that the power draw $P_{PA}$ of the primary appliance PA is substantially equal to the threshold power level $P_{TH}$ (that is, not significantly greater than or less than $P_{TH}$, e.g., $P_{TH} \pm 3$ watts), the controller 300 may be programmed to either open or close the power switch 202 depending on the preference of the user of the system 10, the system settings, the types of appliances (PA or SA), or on other factors.

In some embodiments, the various settings of the system 10 (e.g., the threshold power level(s) $P_{TH}$) may be pre-set at the factory level and not editable or otherwise programmable by the user of the system 10. In other embodiments, the system 10 may provide access to the controller settings via an integrated development environment (IDE) or other type of administrative tool or interface. In this case, the user of the system 10 may program or otherwise manage the settings (e.g., the threshold power level(s) $P_{TH}$) used by the system 10 during operation.

Housing Assembly 400

In one exemplary embodiment hereof as shown in FIG. 1, the power sensing system 100, the power switch assembly 200, and/or the controller 300 are each housed within the housing assembly 400. In some embodiments, the housing assembly 400 includes an electrical junction box such as a mounting box, a fixture box, a handy box, a remodeling box, a receptacle box, an outlet box, other types of junction boxes, and any combination thereof. The housing assembly 400 may comprise acrylonitrile-butadiene-styrene (ABS), aluminum, fiberglass, stainless steel, steel, polycarbonate, polystyrene, other types of materials, and any combination thereof. The housing assembly 400 may include any size or shape defining any adequate inner volume to house the system 10. In some embodiments, the system 10 is electrically connected to the power supply PS, the primary appliance PA, and the secondary appliance SA using properly rated electrical wiring and associated components as is well known in the art.

In some embodiments, it is preferable that the housing assembly 400 adhere to an appropriate rating from the National Electrical Manufacturer's Association (NEMA) such as NEMA 1, NEMA 2, NEMA 3, NEMA 3R, NEMA 3S, NEMA 3X, NEMA 3RX, NEMA 3SX, NEMA 4, NEMA 4X, NEMA 6, NEMA 6P, NEMA 7, NEMA 8, NEMA 9, NEMA 10, NEMA 12, NEMA 12K, NEMA 13 and/or other ratings.

In some embodiments, it is preferable that the system 10 be UL rated and approved for its appropriate usage as is known in the art.

EXAMPLES

Additional embodiments and details of the system 10 will be described by way of several detailed examples. The examples provided below are chosen to illustrate various embodiments and implementations of the system 10, and those of ordinary skill in the art will appreciate and understand, upon reading this description, that the examples are not limiting and that the system 10 may be used in different ways.

In a first example as shown in FIG. 2, the primary appliance PA includes an electric clothes dryer, and the secondary appliance SA includes a Type 2 (240 VAC @ up to 32 Amps) electric vehicle (EV) charger. Both the electric clothes dryer and the EV charger are connected to the same 240 VAC circuit breaker (e.g., PS) via the system 10. In use, when the electric dryer is operating and drawing 200 watts of power or more, the EV charger is switched offline (not electrically connected to the circuit breaker). However, if the electric dryer is not operating or otherwise drawing less than 200 watts of power, the system 10 switches the EV charger in-line with the circuit breaker so that it too may draw power and charge an EV.

In this example, the system 10 effectively enables the sharing of a single 240 VAC circuit breaker between the electric clothes dryer and the EV charger, with the electric dryer having priority over the EV charger.

In some embodiments, an EV charger (e.g., the Type 2 EV charger described above and/or any other type of EV charger) is integrated into the system 10 so that an electric vehicle may interface directly with the system 10. For example, the system 10 may include a standard J1772 connector and a sufficient length of electrical cable (e.g., 25-foot and preferably UL rated and approved) that may be used to electrically connect the electrical vehicle, shown in FIG. 2 in an exemplary format, to the power switch assembly 200. In this way, the electric vehicle (acting as the secondary appliance in this example) may be conveniently plugged into the system 10 using standard procedures to receive a switched power connection to the power source PS. In some embodiments of this type, the system 10 may provide up to 7 KW of power to the EV. In this way, the system 10 acts as electric vehicle supply equipment (EVSE) to supply electrical energy to recharge electric vehicles. In this case, the system 10 also may be referred to as an EV charging station.

In some embodiments, the system 10 includes a ground-fault circuit interrupter (GFCI) designed to shut off electric power to the EV in the event of a ground-fault on the 240 VAC charge power.

It is understood that any aspect or element of any embodiment described herein or otherwise may be combined with any other aspect or element of any other embodiment to form additional embodiments all of which are within the scope of the system 10.

As used herein, including in the claims, the phrase "at least some" means "one or more," and includes the case of only one. Thus, e.g., the phrase "at least some ABCs" means "one or more ABCs," and includes the case of only one ABC.

As used in this description, the term "portion" means some or all. So, for example, "A portion of X" may include some of "X" or all of "X". In the context of a conversation, the term "portion" means some or all of the conversation.

As used herein, including in the claims, the phrase "based on" means "based in part on" or "based, at least in part, on," and is not exclusive. Thus, e.g., the phrase "based on factor X" means "based in part on factor X" or "based, at least in part, on factor X." Unless specifically stated by use of the word "only", the phrase "based on X" does not mean "based only on X."

As used herein, including in the claims, the phrase "using" means "using at least," and is not exclusive. Thus, e.g., the phrase "using X" means "using at least X." Unless specifically stated by use of the word "only", the phrase "using X" does not mean "using only X."

In general, as used herein, including in the claims, unless the word "only" is specifically used in a phrase, it should not be read into that phrase.

As used herein, including in the claims, the phrase "distinct" means "at least partially distinct." Unless specifically stated, distinct does not mean fully distinct. Thus, e.g., the phrase, "X is distinct from Y" means that "X is at least partially distinct from Y," and does not mean that "X is fully distinct from Y." Thus, as used herein, including in the claims, the phrase "X is distinct from Y" means that X differs from Y in at least some way.

It should be appreciated that the words "first" and "second" in the description and claims are used to distinguish or identify, and not to show a serial or numerical limitation. Similarly, the use of letter or numerical labels (such as "(a)", "(b)", and the like) are used to help distinguish and/or identify, and not to show any serial or numerical limitation or ordering.

While the invention has been described in connection with what is presently considered to be the most practical and preferred embodiments, it is to be understood that the invention is not to be limited to the disclosed embodiment, but on the contrary, is intended to cover various modifications and equivalent arrangements included within the spirit and scope of the appended claims.

Although certain presently preferred embodiments of the invention have been described herein, it will be apparent to those skilled in the art to which the invention pertains that variations and modifications of the described embodiments may be made without departing from the spirit and scope of the invention.

The foregoing description of the preferred embodiment of the present invention has been presented for the purpose of illustration and description. It is not intended to be exhaustive or to limit the invention to the precise form disclosed. Many modifications and variations are possible in light of the above teachings. It is intended that the scope of the present invention is not limited by this detailed description, but by the claims and the equivalents to the claims appended hereto.

The invention claimed is:

1. An electrical power sharing system comprising:
a first port adapted to receive electrical power from a power supply;
a second port in electrical communication with the first port and adapted to deliver to a first load a first amount of the electrical power received at the first port;
a power sensing device configured to sense a first value representative of the first amount of electrical power delivered by the second port to the first load and to output a first signal based on the sensed first value;

a power switch including a switch input and a switch output, and adapted to provide an electrical connection or an electrical disconnection between the switch input and the switch output, the switch input in electrical communication with the first port;

a third port in electrical communication with the switch output; and a controller in communication with the power sensing device and the power switch, and including memory storing at least one power level threshold;

wherein the controller is adapted to receive the first signal from the power sensing device, to process the first signal in relation to the at least one power level threshold, and, based at least in part on an outcome of the processing, to cause the power switch to provide either an electrical connection or an electrical disconnection between the switch input and the switch output.

2. The electrical power sharing system of claim 1, wherein when the power switch provides an electrical connection between the switch input and the switch output, the third port is adapted to deliver to a second load a second amount of electrical power received at the first port.

3. The electrical power sharing system of claim 1, wherein the power sensing device includes a current sensing device.

4. The electrical power sharing system of claim 3, wherein the first value includes a value of electrical current.

5. The electrical power sharing system of claim 1, wherein the controller is adapted to transform the first value into a first power value.

6. The electrical power sharing system of claim 5, wherein the controller is adapted to process the first signal in relation to the at least one power level threshold by comparing the first power level to the at least one power level threshold.

7. The electrical power sharing system of claim 6, wherein the controller is adapted to cause the power switch to provide an electrical connection between the switch input and the switch output when the comparison determines that the first power level is less than the at least one power level threshold.

8. The electrical power sharing system of claim 6, wherein the controller is adapted to cause the power switch to provide an electrical disconnection between the switch input and the switch output when the comparison determines that the first power level is greater than the at least one power level threshold.

9. The electrical power sharing system of claim 1, further comprising a housing configured to contain the power sensing device, the power switch, and the controller.

10. The electrical power sharing system of claim 1, further comprising an electric vehicle charger electrically coupled to the third port.

11. The electrical power sharing system of claim 10, wherein the electric vehicle charger includes a Type 2 electric vehicle charger.

12. The electrical power sharing system of claim 11, wherein the at least one power level threshold equals 200 watts.

13. A method for sharing electrical power comprising:
(A) providing a first port in electrical communication with a second port, the first port configured to receive first electrical power and the second port adapted to deliver second electrical power;
(B) electrically coupling a primary appliance to the second port, the primary appliance configured to draw at least a portion of the second electrical power;
(C) providing a power sensing device between the first port and the second port and adapted to sense a first value representative of the at least a portion of the second electrical power drawn by the primary appliance;
(D) providing a power switch including a switch input and a switch output, and adapted to provide an electrical connection or an electrical disconnection between the switch input and the switch output, the switch input in electrical communication with the first port;
(E) providing a third port in electrical communication with the switch output, the third port adapted to deliver third electrical power;
(F) electrically coupling a secondary appliance to the third port, the secondary appliance configured to draw at least a portion of the third electrical power;
(G) providing a controller in communication with the power sensing device and the power switch, and including memory storing at least one power level threshold;
(H) using the power sensing device to sense a first value representative of the at least a portion of the second electrical power drawn by the primary appliance;
(I) using the controller to process the first signal in relation to the at least one power level threshold to determine if the at least a portion of the second electrical power drawn by the primary appliance is less than the at least one power level threshold; and
(J) in response to a determination in (I) that the at least a portion of the second electrical power drawn by the primary appliance is less than the at least one power level threshold, then:
(K) using the controller to cause the power switch to provide an electrical connection between the switch input and the switch output.

14. The method of claim 13 further comprising:
(L) in response to a determination in (I) that the at least a portion of the second electrical power drawn by the primary appliance is greater than the at least one power level threshold, then:
(M) using the controller to cause the power switch to provide an electrical disconnection between the switch input and the switch output.

15. The method of claim 13 further comprising:
(G)(1) using the controller to cause the power switch to provide an electrical disconnection between the switch input and the switch output.

16. The method of claim 13 wherein the power sensing device includes a current sensing device.

17. The method of claim 13 wherein the first value includes a value of electrical current.

18. The method of claim 13 further comprising:
(E)(1) electrically coupling an electric vehicle charger between the switch output and the third port.

19. The method of claim 18 wherein the electric vehicle charger includes a Type 2 electric vehicle charger.

20. The method of claim 19 wherein the at least one power level threshold equals 200 watts.

* * * * *